United States Patent
Kiefer et al.

(10) Patent No.: US 11,455,847 B2
(45) Date of Patent: Sep. 27, 2022

(54) METHOD AND APPARATUS FOR OBTAINING EVENT RELATED DATA

(71) Applicant: GM GLOBAL TECHNOLOGY OPERATIONS LLC, Detroit, MI (US)

(72) Inventors: Raymond J. Kiefer, Huntington Woods, MI (US); Samuel T. Haberl, Detroit, MI (US); Eric L. Raphael, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 16/295,767

(22) Filed: Mar. 7, 2019

(65) Prior Publication Data

US 2020/0286308 A1    Sep. 10, 2020

(51) Int. Cl.
| | |
|---|---|
| *B60K 35/00* | (2006.01) |
| *G07C 5/08* | (2006.01) |
| *H04W 4/44* | (2018.01) |
| *B60R 21/0136* | (2006.01) |
| *B60R 21/0134* | (2006.01) |
| *H04W 4/46* | (2018.01) |

(52) U.S. Cl.
CPC .......... *G07C 5/085* (2013.01); *B60R 21/0134* (2013.01); *B60R 21/0136* (2013.01); *H04W 4/44* (2018.02); *H04W 4/46* (2018.02)

(58) Field of Classification Search
CPC ...... G07C 5/085; G07C 5/008; G07C 5/0866; H04W 4/44; H04W 4/46; B60R 21/0136; B60R 21/0134; G08G 1/0116; G08G 1/0112; G08G 1/04; G06Q 50/30

USPC .......................................................... 701/32
See application file for complete search history.

(56) References Cited

U.S. PATENT DOCUMENTS

| | | | |
|---|---|---|---|
| 2002/0135679 A1* | 9/2002 | Seaman ............. | B60R 25/1004 348/148 |
| 2009/0268947 A1* | 10/2009 | Schaufler .......... | G06K 9/00805 382/104 |
| 2010/0172543 A1* | 7/2010 | Winkler ................. | G08G 1/017 382/104 |
| 2010/0219944 A1* | 9/2010 | Mc Cormick ......... | G07C 5/008 340/436 |
| 2011/0060496 A1* | 3/2011 | Nielsen .............. | G06Q 10/0631 701/1 |
| 2013/0274950 A1* | 10/2013 | Richardson .......... | G08G 1/0112 701/1 |
| 2015/0081157 A1 | 3/2015 | Banasky, Jr. et al. | |
| 2015/0170429 A1 | 6/2015 | Denny et al. | |
| 2015/0365664 A1* | 12/2015 | Yousefi .................. | H04N 7/183 375/240.02 |

(Continued)

FOREIGN PATENT DOCUMENTS

| | | |
|---|---|---|
| CN | 105869230 A | 8/2016 |
| CN | 108860166 A | 11/2018 |

*Primary Examiner* — Jonathan M Dager
*Assistant Examiner* — Jean W Charleston
(74) *Attorney, Agent, or Firm* — Lorenz & Kopf LLP

(57) ABSTRACT

The present application generally relates to a method and apparatus for obtaining incident related data in a motor vehicle. In particular, the system is operative to determine a vehicle to vehicle contract event or near contact event, transmit a request for data, such as video, numeric, and telemetry data, from proximate actors via V2X communications channel, or to request the data be transmitted to a network storage location.

12 Claims, 3 Drawing Sheets

(56) References Cited

U.S. PATENT DOCUMENTS

| | | | |
|---|---|---|---|
| 2016/0006922 A1* | 1/2016 | Boudreau | B60R 1/00 |
| | | | 348/207.1 |
| 2016/0357187 A1* | 12/2016 | Ansari | G06V 20/58 |
| 2017/0092018 A1 | 3/2017 | Throop et al. | |
| 2017/0300503 A1* | 10/2017 | Wang | G06F 16/70 |
| 2018/0297543 A1* | 10/2018 | Loeffler | B60R 21/01 |
| 2019/0375357 A1* | 12/2019 | Mezaael | B60R 11/04 |

\* cited by examiner

METHOD AND APPARATUS FOR OBTAINING EVENT RELATED DATA

BACKGROUND

The present disclosure relates generally to vehicle to vehicle, vehicle to back office, and/or vehicle to all communications, and more particularly, includes communications systems used on vehicles. More specifically, aspects of the present disclosure relate to systems, methods and devices for obtaining vehicle incident and near-incident related data from surrounding vehicles and infrastructure by detecting a incidence and collecting data from proximate vehicles with and without location related information.

Modern vehicles typically include onboard data recording systems for monitoring vehicular systems during operation. This information may be stored in a memory and is useful in examining contact and near-contact events involving the vehicle. For example, when a vehicle to vehicle contact event is detected, such as by deployment of airbags or the like, data in the vehicular processor, such as vehicle speed, various accelerations, braking system engagement and steering information may be stored for later analysis. However, even the most advanced form of automotive event determination used today in the automotive industry are restricted to using information available from the driver's own vehicle, are only designed to trigger for more serious events and do not accommodate surrounding vehicular camera image and numeric data before, during and after the event. It would be desirable to overcome these limitations and in doing so substantially improve the quality of image and numeric data surrounding circumstances for both serious and less serious vehicular events.

The above information disclosed in this background section is only for enhancement of understanding of the background of the invention and therefore it may contain information that does not form the prior art that is already known to a person of ordinary skill in the art.

SUMMARY

Disclosed herein are object detection methods and systems and related control logic for provisioning vehicle sensing and control systems, methods for making and methods for operating such systems, and motor vehicles equipped with onboard sensor and control systems. By way of example, and not limitation, there is presented various embodiments of data storage systems for detecting vehicle data and for communications systems for receiving vehicle data from proximate vehicles and proximate infrastructure are disclosed herein.

In accordance with an aspect of the present invention, an apparatus comprising a sensor for detecting an event, a processor for generating a request for data in response to the event, a transmitter for transmitting the request for data, a receiver for receiving a received data, and a memory for storing the received data.

In accordance with another aspect of the present invention an apparatus for collecting vehicle incident related data comprising a first camera having a memory for buffering a first video file, an airbag deployment sensor for generating a control signal in response to an airbag deployment, a non-volatile memory, a transmitter for transmitting a request for data, a receiver for receiving a second video file, and a processor for receiving the control signal, for generating a requested for data in response to the control signal, for receiving and storing the first video file and the second video file in the non-volatile memory.

In accordance with another aspect of the present invention a method for detecting a vehicle event comprising generating a request for data in response to the detection of the vehicle event, transmitting the requested for data via a vehicle to vehicle communications network, receiving a received data, and storing the received data on a memory.

In accordance with another aspect of the present invention the memory may be a non-volatile memory, the event is detected in response to an airbag deployment, In accordance with another aspect of the present invention the event is detected in response to a change of inertia measured by an inertial sensor.

In accordance with another aspect of the present invention the event is detected in response to a time to collision determination.

In accordance with another aspect of the present invention the received data is transmitted by a proximate vehicle.

In accordance with another aspect of the present invention the received data is a video captured by a camera on a proximate vehicle.

In accordance with another aspect of the present invention the second video file is received from a proximate vehicle in response to the request for data.

In accordance with another aspect of the present invention the request for data is transmitted via a vehicle to vehicle communications network.

In accordance with another aspect of the present invention the second video file is received from an infrastructure camera in response to the request for data.

In accordance with another aspect of the present invention and the processor is further operative to estimate a time to collision and wherein the request for data is generated in response to the time to collision The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
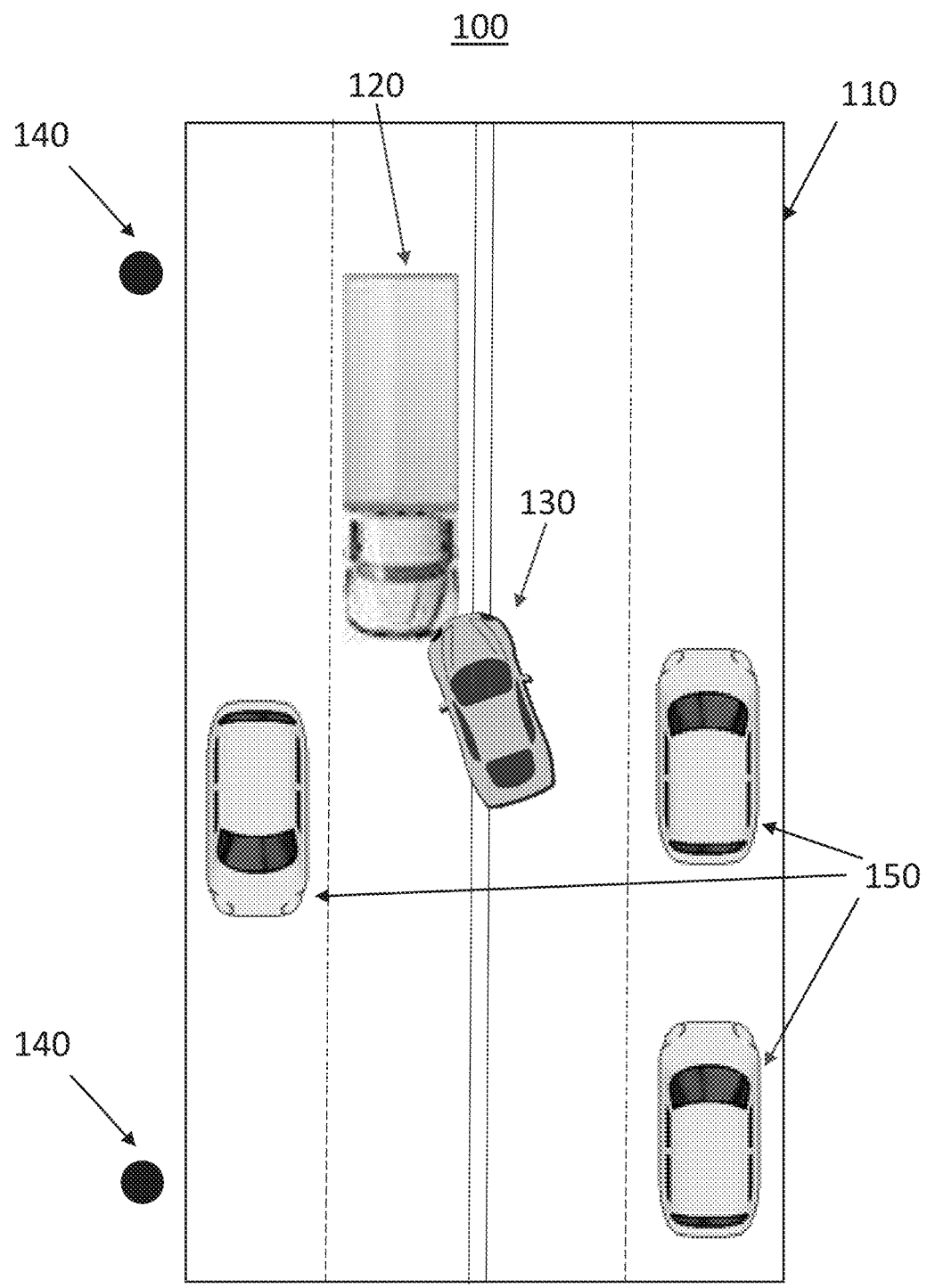
FIG. 1 illustrates an exemplary application of the method and apparatus for obtaining event-related data in a motor vehicle according to an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The presently disclosed method and system are operative for collecting data in response to an automotive incident, such as a contact event or near-contact event. The benefits of such methods apply to both emerging Automated Vehicle (AV), as well as more traditional non-AV applications. Currently the most advanced form of vehicle to vehicle contact event determination, such as on-board data recording using delta-Velocity and Principal Direction of Force impact triggers are restricted to using information available from the driver's own vehicle. Additionally, event determination thresholds employed are restricted to identifying more serious events, in part to avoid false alarms, and unnecessary accumulation of data.

The system is operative to use surrounding vehicle data, such as automotive camera and numeric data and infrastructure camera and numeric data, to understand the occurrence, nature, and severity of an incident. The proposed method and system may substantially improve the quality of numeric and image data surrounding event circumstances for both serious and less serious events. This data could also be used in cases where data from the driver's vehicle is not available.

Data gathered via incident determination method may provide benefits in many areas, including: (1) informing police and medical 1st responders on event severity, (2) insurance fault/rate determination, (3) safety feature effectiveness research used to drive consumer metric and OEM regulations, including comparing the safety of AVs to non-AVs, (4) improving existing and developing new Active Safety and AV systems (e.g., via in-vehicle or off-line data processing and machine learning), (5) assessing teen driver readiness to drive and providing parent feedback, (6) risk-screening of ride-share drivers of fleet-owned vehicles, (7) providing event-related information when such information may not be available, or may be compromised, on a driver's own vehicle due to event severity or privacy reasons, or if the driver has opted out of such data collection.

FIG. 1 schematically illustrates an exemplary application of the method and apparatus for obtaining event-related data from surrounding vehicles and infrastructure in a motor vehicle 100 according to the present disclosure. In this exemplary embodiment, a vehicle 130 is traveling along a road 110 and has triggered a contact event with another vehicle 120. There are a number of proximate vehicles 150 in the vicinity of the contact event. In this exemplary embodiment, there are three proximate vehicles 150 in the vicinity collecting data concerning their respective vehicle operation. This data may include velocity, location, weather camera data, traction data, etc. This proximate vehicle data may also include recording image data collected via various cameras installed on the vehicle, such as lane departure warning cameras having a forward facing view, rear view cameras, side cameras and the like. In addition, there may be infrastructure cameras 140 proximate to the contact event, such as traffic cameras, traffic light cameras, speed cameras, etc. These infrastructure cameras 140 may further determine rate of speed and location of vehicles, pedestrians, and other objects, weather and driving conditions and other data concerning vehicles within a field of view.

In this exemplary embodiment, the vehicle 130 is involved in a contact event. The contact event is detected in response to sensors in the vehicle 130. The vehicle 130 is then operative to transmit a requested via a wireless communications channel or network, such as vehicle to vehicle (V2V), vehicle to infrastructure (V2I), vehicle to everything (V2X), or vehicle to back office communications to the proximate vehicles 150 and the proximate infrastructure cameras 140. In one exemplary embodiment, the proximate vehicles 150 and the proximate infrastructure cameras 140 are then operative to transmit camera and/or telemetry data to a server wherein the data can then be retrieved in response to a contact investigation. In a second embodiment, the data is saved in a memory located within the proximate vehicles 150 and the proximate infrastructure cameras 140 and transmitted in response to a second request. In a third embodiment, the data is transmitted to the vehicle 130 and stored in a memory within the vehicle 130. This data may be combined with vehicle 130 telemetry and camera images and retrieved in response to a download or access request.

Figure 2:
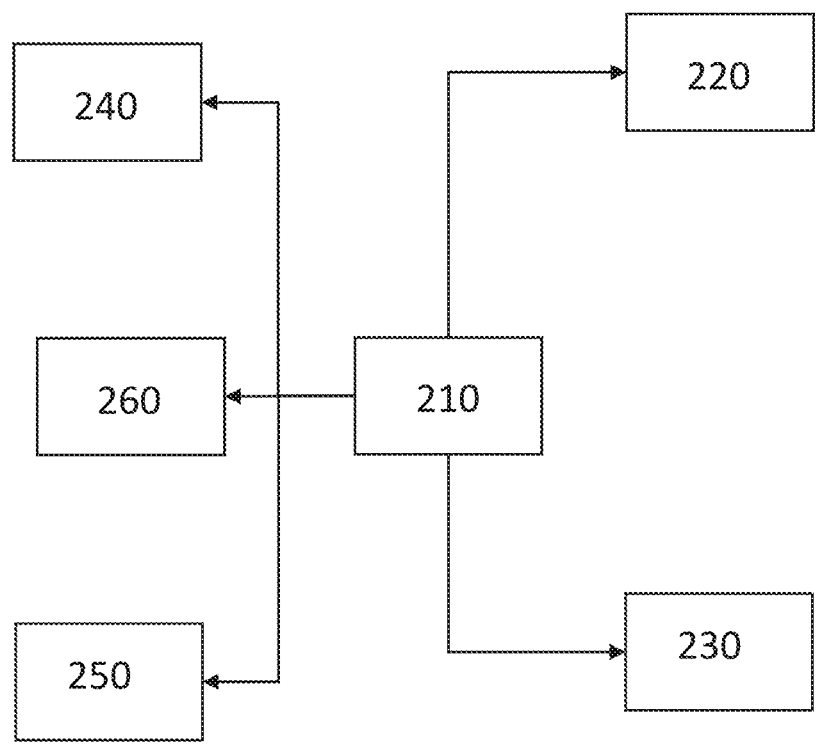
FIG. 2 shows a block diagram illustrating an exemplary system for obtaining event-related data in a motor vehicle according to an embodiment of the present disclosure.

Turning now to FIG. 2, a block diagram illustrating an exemplary system 200 for obtaining contact-related data in a motor vehicle is shown. The exemplary system includes a transmitter 220, a receiver 230, a processor 210 and a memory 260. In addition, the exemplary system 200 may include at least one camera 240 for capturing image and/or video data and a sensor 250 for sensing a contact event.

In a first exemplary embodiment, the sensor 250 is operative to generate a detection signal in response to a determination that a contact event may have occurred. This determination may be made in response to a change in inertia detected by an inertial sensor, a deployment of airbags, or other means of estimating a contact event. A near contact event may be determined in response to a contact detection algorithm using time to collision required braking or other such data to estimate a contact likelihood. The detection signal is coupled to the processor 210. The processor is then operative to couple a request signal to the transmitter 220. The request signal includes information requesting image, numeric and/or telemetry data from proximate vehicles and infrastructure. The information may further include location data of the vehicle such that only images captured from cameras where the event is in the field of view are prioritized or transmitted. The processor 210 is further operative to store data from the onboard sensors 250, onboard telemetry devices, and from the onboard cameras 240 to the memory 260. Data from the cameras 240 may include video taken before and after the contact event and/or still images. These images and video may have been buffered in a memory before contact event. The processor is further operative to receive data from proximate vehicles and infrastructure in response to the request via the receiver 230. The processor 210 is then operative to couple this received data to the memory 260 for storage. The memory 260 is ideally a non-volatile memory such that data is retained in storage in the event of power loss to the memory or the like. In addition, the memory 260 may be removeable or modular, such that it can be removed from the vehicle to examination in a separate location.

Alternatively, the processor 210 may generate a signal for transmit to a back office server, such as an OnStar server or the like, in response to the contact or near contact event. The back office server may then transmit the request to proximate vehicles in the area. The back office server may then be operative to receive the requested data from the proximate vehicles in the area and to store this data for later retrieval. In the exemplary embodiment, data may be requested from OnStar subscribers or from any OnStar equipped vehicle.

Figure 3:
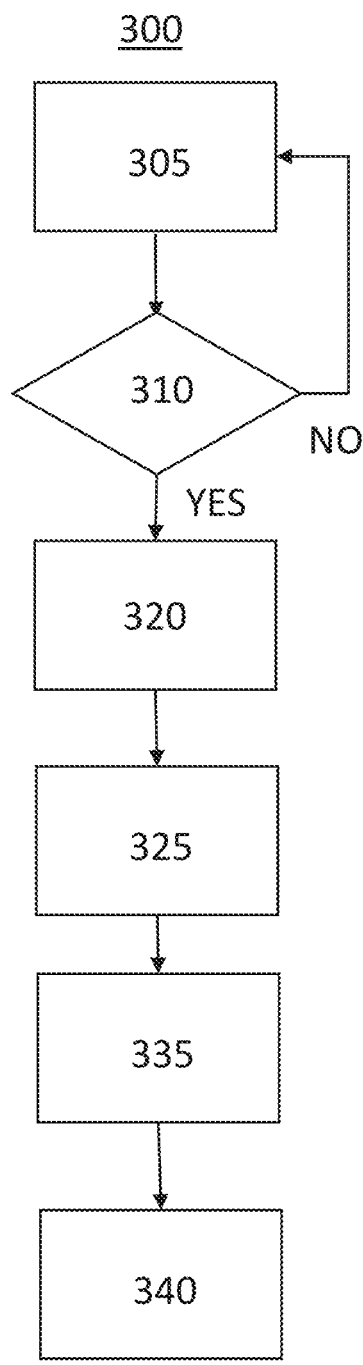
FIG. 3 shows a flowchart illustrating an exemplary method for obtaining event-related data according to an embodiment of the present disclosure The exemplifications set out herein illustrate preferred embodiments of the invention, and such exemplifications are not to be construed as limiting the scope of the invention in any manner.

Turning now to FIG. 3, a flow chart illustrating an exemplary method 300 for obtaining contact-related data in a motor vehicle motor vehicle is shown. The method 300 is first operative to buffer telemetry, numeric, image, and/or video data and store this data in a buffer memory 305. The data may include data from the onboard sensors, onboard telemetry devices, and from the onboard cameras. Data from the cameras may include video from front, side and rear mounted cameras, lidar data, radar data and the like. The method is then operative to determine if a contact event has occurred 310. This determination may be made in response to a change in inertia detected by an inertial sensor, a deployment of airbags, or other means of estimating a contact event. A near contact event may be determined in response to a contact detection algorithm using time to collision required braking or other such data to estimate a contact likelihood. If no contact event is detected 310, some of the data stored in the buffer memory is deleted or overwritten and more recent data is stored.

If a contact event is detected 310, the data stored in the memory is stored in a non-volatile memory 320 if the buffer memory is volatile. Data from the cameras and other sensors may include video and data recorded before and after the contact event and/or still images. A request for data is then generated and transmitted via V2X communication channels 325. The request for data may include information requesting image, numeric and/or telemetry data from proximate vehicles and infrastructure. The information may further include location data of the vehicle such that only images captured from cameras where the event is in the field of view are prioritized or transmitted. Data is received in response to the requested 335 from proximate vehicles and infrastructure. This data is then stored in the nonvolatile memory 340. Furthermore, data may be transmitted by the vehicle and/or the proximate vehicles and proximate infrastructure to a remote server in response to the request for data. Location data may be included in the request for data transmitted from the vehicle. The request for data may also include a destination address for the requested data, such as an internet protocol address for a server or the like. For example, image data or video files may be captured by a first camera having a memory for buffering a first video file. An airbag deployment sensor may be operational for generating a control signal in response to an airbag deployment and a processor operative for receiving the control signal, for generating a requested for data in response to the control signal, for receiving and storing the first video file and the second video file on the non-volatile memory.

In addition, the method may be further operative to generate a signal for transmit to a back office server, such as an OnStar server or the like, in response to the contact or near contact event. The back office server may then transmit the request to proximate vehicles in the area. The back office server may then be operative to receive the requested data from the proximate vehicles in the area and to store this data for later retrieval. In the exemplary embodiment, data may be requested from OnStar subscribers or from any OnStar equipped vehicle.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might" "may," "e.g.," and the like, unless specifically stated otherwise; or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3" "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus for collecting vehicle incident related data within a host vehicle comprising:
   a first camera, within the host vehicle, having a memory for buffering a first video file;
   an airbag deployment sensor, within the host vehicle, for generating a control signal in response to an airbag deployment within the host vehicle;
   a non-volatile memory for storing the first video file and a second video file;
   a transmitter for transmitting a request for data from the host vehicle to a proximate vehicle via a vehicle to vehicle communications network;
   a receiver, within the host vehicle, for receiving the second video file from the proximate vehicle via the vehicle to vehicle communications network wherein the second video file is captured by a second camera with the proximate vehicle; and
   a processor, within the host vehicle, for receiving the control signal, for generating the request for data in response to the control signal, for receiving and storing the first video file and the second video file on the non-volatile memory, the processor being further operative to estimate a time to collision and to generate the request for data in response to the time to collision.

2. The apparatus of claim 1 wherein the second video file is received from an infrastructure camera in response to the request for data.

3. An apparatus comprising:
   an airbag deployment sensor within a host vehicle for detecting an airbag deployment event;
   a processor within the host vehicle for generating a request for data in response to the airbag deployment event, the processor being further operative to estimate a time to collision and to generate the request for data in response to the time to collision;
   a transmitter, within the host vehicle, for transmitting the request for data to a proximate vehicle via a vehicle to vehicle communications network;
   a receiver, within the host vehicle, for receiving a received data including a first video from a proximate vehicle via a vehicle to vehicle communications network wherein the first video is captured by a first camera with the proximate vehicle; and
   a memory within the host vehicle for storing the received data including the first video.

4. The apparatus of claim 3 wherein the memory is a non-volatile memory.

5. The apparatus of claim 3 further comprising a second camera within the host vehicle for capturing a second video and wherein the second video is stored in the memory in response to the airbag deployment event.

6. The apparatus of claim 3 wherein the airbag deployment sensor is an inertial sensor and the airbag deployment event is determined in response to a change in a measured inertia.

7. The apparatus of claim 3 wherein the request for data is transmitted via a wireless communications channel.

8. The apparatus of claim 3 wherein the received data includes the first video captured by a camera on the proximate vehicle.

9. A method comprising:
   detecting an airbag deployment event within a host vehicle;
   generating, by a processor within the host vehicle, a request for data in response to the detection of the airbag deployment event, the processor being further operative to estimate a time to collision and to generate the request for data in response to the time to collision;
   transmitting, by a transmitter, the requested for data via a wireless communications network to a proximate vehicle;

receiving, by a receiver, a received data including a first video file from the proximate vehicle via the wireless communications network wherein the first video file is captured by a first camera with the proximate vehicle; and storing, in a non-volatile memory, the received data including the first video file.

10. The method of claim 9 wherein the airbag deployment event is detected by an airbag deployment sensor.

11. The method of claim 9 further comprising capturing a second video file, by a second camera within the host vehicle, and a vehicle telemetry data in response to the airbag deployment event and storing the second video file and the vehicle telemetry data in the non-volatile memory.

12. The method of claim 9 wherein the airbag deployment event is detected in response to a change of inertia measured by an inertial sensor.

\* \* \* \* \*